United States Patent

Kim et al.

Patent Number: 5,933,194
Date of Patent: Aug. 3, 1999

[54] METHOD AND CIRCUIT FOR DETERMINING QUANTIZATION INTERVAL IN IMAGE ENCODER

[75] Inventors: Seong-jin Kim; Sung-gul Ryoo, both of Suwon; Seung-kwon Paek, Seoul, all of Rep. of Korea

[73] Assignee: Samsung Electronics Co., Ltd, Suwon, Japan

[21] Appl. No.: 08/741,789

[22] Filed: Nov. 1, 1996

[30] Foreign Application Priority Data

Nov. 1, 1995 [KR] Rep. of Korea ...................... 95-39224

[51] Int. Cl.⁶ .............................. H04N 7/12; H04N 11/02; H04N 11/04
[52] U.S. Cl. ..................... 348/403; 348/405; 348/414; 348/417; 348/418
[58] Field of Search ................................. 348/405, 419, 348/414, 417, 418, 403, 404; H04N 7/12, 11/02, 11/04

[56] References Cited

U.S. PATENT DOCUMENTS

| | | | |
|---|---|---|---|
| 5,134,476 | 7/1992 | Aravind et al. | 348/415 |
| 5,214,507 | 5/1993 | Aravind et al. | 348/415 |
| 5,412,430 | 5/1995 | Nagata . | |
| 5,416,522 | 5/1995 | Igarashi | 348/415 |
| 5,481,553 | 1/1996 | Suzuki et al. | 348/415 |

OTHER PUBLICATIONS

"Test Model 4—Coded Representation of Picture and Audio Information", Test Model Editing Committee, International Organisation for Standardisation, pp. 72–75 (Jan. 1993).

Primary Examiner—Tommy P. Chin
Assistant Examiner—Nhon T. Deip
Attorney, Agent, or Firm—Rothwell, Figg, Ernst & Kurz

[57] ABSTRACT

Quantization interval determining method and circuit are provided. The quantization interval determining circuit has a quantizer matrix calculator, a macroblock classifier, a reference quantization interval storage, a block classifier, a bit table storage, a histogram calculator, a frame bit generation predictor, a reference quantization interval adjuster, a target bit allocator, and a bit rate controller. In the quantization interval determining method and circuit, a video signal is classified based on human visual sense characteristics, a reference quantization interval suited for each class is determined, a target bit is adaptively allocated, considering distribution of the video signal, to determine a quantization interval compatible with a given transmission speed, simultaneously with the reference quantization interval determination, and then a final quantization interval is determined. Therefore, when encoding a video signal by using a quantization interval obtained in the above manner, the compression rate of a video signal and the quality of a restored image can be increased.

2 Claims, 2 Drawing Sheets

METHOD AND CIRCUIT FOR DETERMINING QUANTIZATION INTERVAL IN IMAGE ENCODER

BACKGROUND OF THE INVENTION

The present invention relates to an image encoder, and more particularly, to a method and circuit for determining quantization intervals, taking full account of human visual perception characteristics.

A digital video signal, which includes much information, should be encoded for transmission through a transmission line of limited capacity. As efficient encoding methods for minimizing both degradation of image quality and information, there are known various transform encoding techniques such as differential pulse coded modulation (DPCM) for obtaining a difference image (using motion-estimation and motion-compensation of a video signal), and discrete cosine transform (DCT). Such techniques focus on minimization of redundancy in video signals and compressing information by quantization. Hence, in quantizing a video signal, it is very significant to minimize degradation of the quality of a restored image and to maximize information compression.

For both the minimization of quality degradation of a restored image and the maximization of information compression, there are two requirements.

First, human visual perception characteristics should be considered in determining optimized quantization intervals. That is, information of a video signal to which the human eye doesn't react sensitively is quantized at a large quantization interval and compressed to a large extent, while information of a video signal to which the human eye is sensitive is quantized at a small quantization interval and compressed to a small extent.

Second, a quantization interval should be determined so that the number of bits resulting from encoding is compatible with a given transmission speed.

In a conventional image encoding method, one frame is generally divided into 16×16 macroblocks, and a quantization interval for each block is determined. Generally, to determine the quantization interval, buffer requirements for a given transmission speed are calculated and a reference quantization interval is obtained in proportion to the calculated buffer requirements. A final quantization interval is determined by adjusting the reference quantization interval using the distribution value of a video signal within the macroblock. However, with respect to the conventional image encoding method, human visual perception characteristics are not sufficiently reflected and the number of bits resulting from encoding is not compatible with a transmission speed.

SUMMARY OF THE INVENTION

To overcome the above problem, it is an object of the present invention to provide a method for determining a quantization interval for fully reflecting human visual perception characteristics for use in an image encoder.

It is another object of the present invention to provide a circuit suited for realizing the above quantization interval determining method.

To achieve the above objects, there is provided a quantization interval determining method comprising the steps of: (a) classifying a video signal on the basis of human visual perception characteristics; (b) determining a reference quantization interval suitable for each class classified in the step (a); (c) predicting the number of bits generated when every macroblock in a frame is quantized at the reference quantization interval; (d) adjusting the reference quantization interval by using the predicted number of bits generated; (e) adaptively allocating a target bit, considering distribution of the video signal to determine a quantization interval suitable for a given transmission speed; and (f) determine a final quantization interval from the adjusted reference quantization interval, a buffer requirement, and the target bit.

In accordance with the present invention, there also is provided a quantization interval determining circuit comprising: a quantizer matrix calculating portion for obtaining a quantization matrix to vary a quantization interval by human visual perception characteristics in 8×8 discrete cosine transform (DCT) blocks, according to the position of a DCT coefficient; a classifying portion for classifying a macroblock according to the human visual perception characteristic of a video signal in the macroblock; a reference quantization interval storing portion for storing a reference quantization interval suitable for the human visual perception characteristic of each macroblock classified in the macroblock classifying portion; a block classifying portion for classifying a block by a distribution value of a video signal in the block; a bit table storing portion for storing the number of bits generated when blocks of each block class classified in the block classifying portion are quantized by different quantization intervals; a histogram calculating portion for calculating the frequency of blocks generated in a frame, for every combination of macroblock classes classified in the macroblock classifying portion and block classes classified in the block classifying portion; a frame bit generation predicting portion for predicting the number of frame bits generated by using a histogram calculated in the histogram calculating portion, when every macroblock in a frame is quantized at the reference quantization interval; a reference quantization interval adjusting portion for adjusting a reference quantization interval stored in the reference quantization interval storing portion by using the number of frame bits predicted in the frame bit generation predicting portion; a target bit allocating portion for allocating a target bit, considering an error between a frame target bit compatible with a transmission speed and the predicted number of frame bits generated, for every combination of the macroblock classes and the block classes; and a bit rate controlling portion for determining a final quantization interval from the adjusted reference quantization interval and a buffer requirement calculated from the number of bits generated by encoding up to a previous macroblock.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
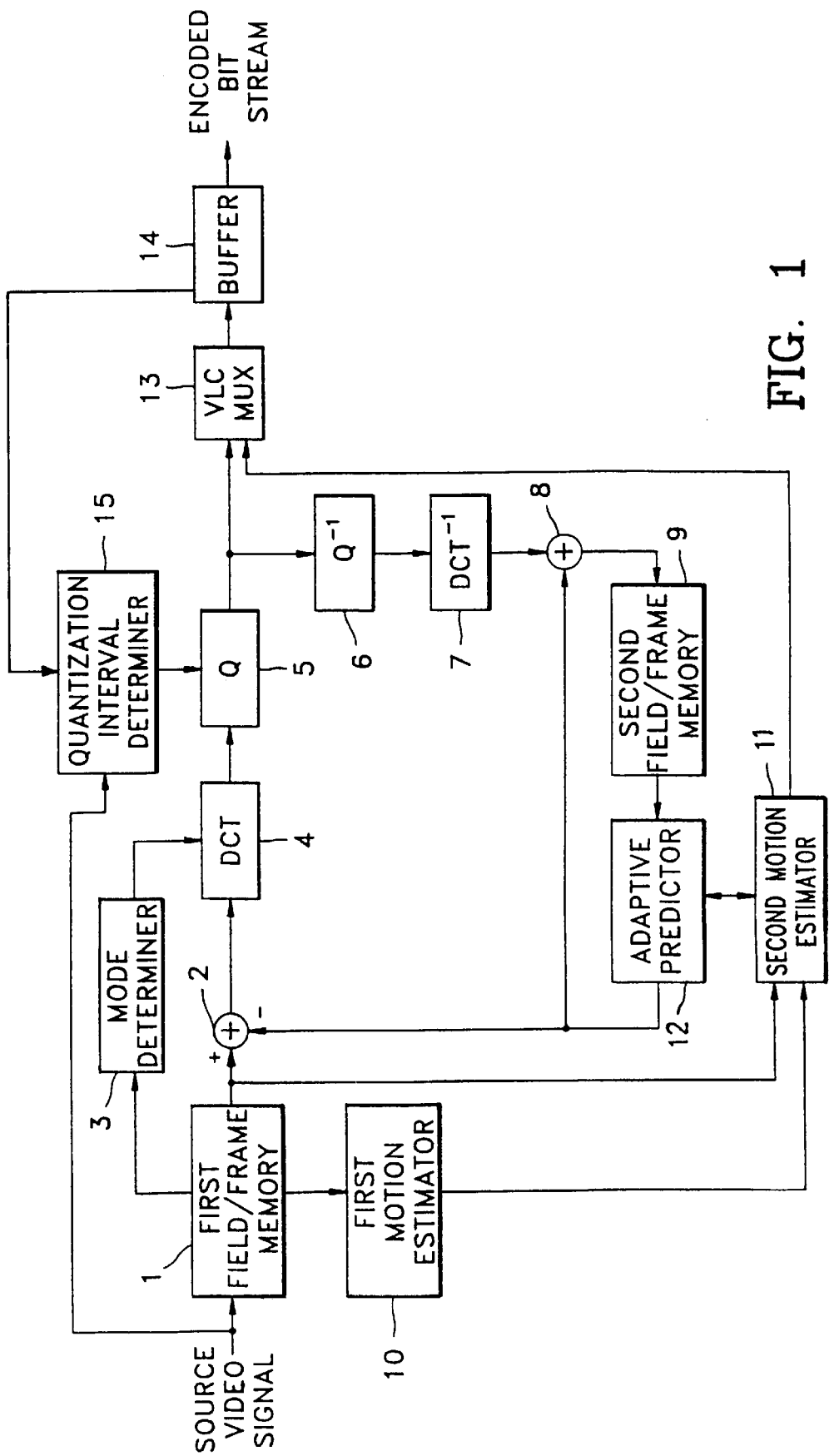
FIG. 1 is a block diagram of a general image encoder to which a quantization interval determining circuit of the present invention is applied.

FIG. 1 illustrates an international standard moving picture encoder, i.e., MPEG-2 encoder, as a general image encoder to which a quantization interval determining circuit of the present invention is applied.

The image encoder of FIG. 1 includes a first field/frame memory 1, a subtractor 2, a mode determiner 3, a discrete cosine transform (DCT) 4, a quantizer (Q) 5, an inverse-quantizer ($Q^{-1}$) 6, an inverse-DCT ($DCT^{-1}$) 7, an adder 8, a second field/frame memory 9, a first motion estimator 10, a second motion estimator 11, an adaptive predictor 12, a variable-length coder/multiplexer (VLC/MUX) 13, a buffer 14, and a quantization interval determiner 15.

Figure 2:
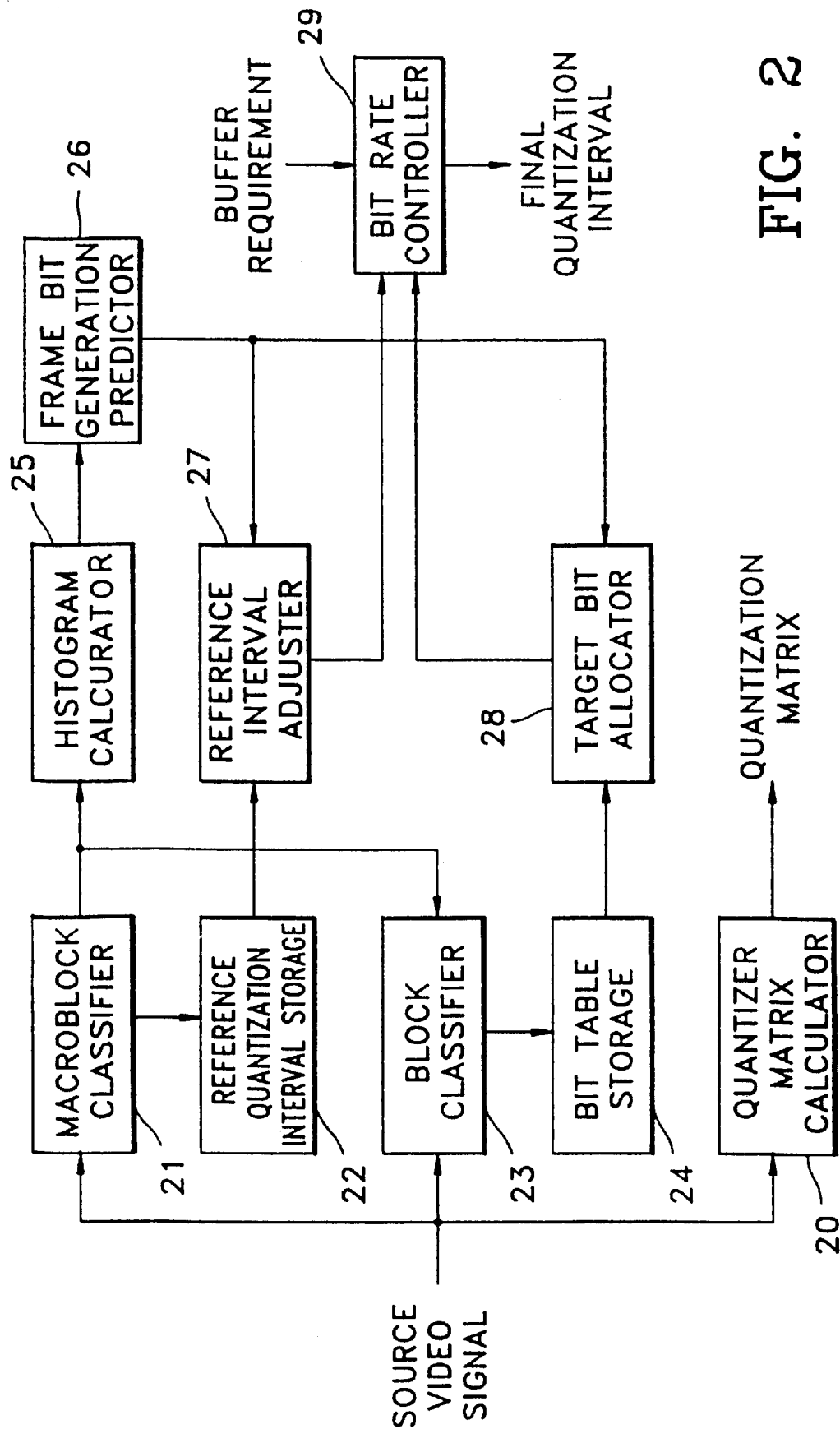
FIG. 2 is a block diagram of the quantization interval determining circuit of the present invention in an image encoder.

FIG. 2 illustrates the quantization interval determiner 15.

The quantization interval determining circuit of FIG. 2 has a quantizer matrix calculator 20, a macroblock classifier 21, a reference quantization interval storage 22, a block classifier 23, a bit table storage 24, a histogram calculator 25, a frame bit generation predictor 26, a reference quantization interval adjuster 27, a target bit allocator 28, and a bit rate controller 29.

The operation of the present invention will be described referring to FIGS. 1 and 2.

In FIG. 1, the field/frame memory 1 receives a source video signal in which frames are rearranged through color coordinate transformation, sub-sampling, and block division, and stores the video signal by field units in case of inter-frame coding or by frame units in case of intraframe coding.

The subtractor 2 subtracts a previous motion-compensated video signal output from the adaptive predictor 12 from the current video signal of field units or frame units, output from the first field/frame memory 1, and generates a difference video signal.

The mode determiner 3 determines a DCT mode, and the DCT 4 performs a DCT-operation on the difference video signal output from the subtractor 2 in the corresponding mode, and outputs a transform coefficient of the difference video signal.

The quantizer 5 quantizes the transform coefficient of the difference video signal, output from the DCT 4, at a quantization interval determined in the quantization interval determiner 15.

The inverse-quantizer 6 restores the quantized signal output from the quantizer 5 to its pre-quantization signal. The inverse-DCT 7 restores the inverse-quantized signal output from the inverse-quantizer 6 to its pre-DCT signal.

The adder 8 adds the restored video signal output from the inverse-DCT 7 to a motion-compensated video signal output from the adaptive predictor 12. The second field/frame memory 9 stores the restored video signal output from the adder 8 in field units or frame units according to a coding mode.

The first and second motion estimators 10 and 11 generate a motion vector for constructing a current image referring to a previous image output from the first field/frame memory 1. To generate motion vectors in most encoders, a predetermined range is fully searched by fixed block units, using a minimum absolute error (MAE) as a reference. The motion vector generated in the second motion estimator 11 is output to the adaptive predictor 12 and the VLC/MUX 13.

The adaptive predictor 12 compensates a motion position of the previous image stored in the second field/frame memory 9 by the motion vector and mode data output from the second motion estimator 11, and outputs the motion-compensated data to the subtractor 2 and the adder 8.

The VLC/MUX 13 variable-length encoder the signal quantized in the quantizer 5, and multiplexes the variable length encoded signal and the motion vector output from the second motion estimator 11.

The buffer 14 temporarily stores the data output from the VLC/MUX 13, because the length of the data varies, and transmits the stored data to a reception terminal at a predetermined speed.

The quantization interval determiner 15 (as illustrated in FIG. 2) determines a quantization interval according to a requirement for the buffer 14. That is, when there is a large requirement for the buffer 14, the volume of data output from the quantizer 5 is reduced by increasing the quantization interval, whereas when the buffer requirements are small, the volume of the data output from the quantizer 5 is increased by reducing the quantization interval. The quantization interval determiner 15 will be described in detail, referring to FIG. 2.

In FIG. 2, the quantizer matrix calculator 20 obtains a quantization matrix by using contrast masking effects depending on average luminance and the positions of DCT coefficients determined when an 8×8 block video signal is DCT-operated. The quantization matrix is made to perform quantization suited for the optic characteristics by varying quantization intervals according to 8×8 blocks and the DCT coefficient positions thereof. There are four kinds of quantization matrices according to luminance/chrominance signals and intra/inter macroblock processing. In addition, a new quantization matrix is calculated and stored if only there is a variation in a picture, and transmitted as additional information at the start of a frame, thus leading to little increase in the number of bits generated. This quantization matrix is achieved in the following method.

First, in determining visual characteristic contrast effects, contrast (CT) depending on a spatial frequency band of an image block, luminance, and brightness difference in color components is defined as follows:

$$CT_{U,V,S} = H(u,v,s,l,\theta,t,d) \quad (1)$$

where u and v are DCT reference frequencies, s is a YUV color coordinate system, l is the sum of an average luminance $l_f$ of an image and an average luminance $l_b$ of an image block and defined as $cd/m^2$, θ is the directionality between DCT frequency components, t is a real contrast value of a monitor according to θ, and d is a factor indicating the deference between a DCT reference frequency and a frequency showing the maximum contrast effect on the monitor. These seven parameters vary with monitor characteristics.

Second, in determining optic characteristic masking effects, when a DCT masker having a frequency band component size of 1 is overlapped with test signals having frequency band components of varying sizes, the human visual perception characteristics to the frequency band component size of the masker varies with the frequency band component size. This is termed contrast masking, and the contrast masking (CM) is given by $$CM_{u,v,s} = CT_{u,v,s} \times ME\{T,M,m, (T,M,C_t) ,M_c,W\} \quad (2)$$

where ME is a function defining the contrast masking of a size component M of the masker with respect to a size component T of the test signal, and a function m(T, M) is an approximation of the contrast masking of the masker to index distribution by using a function $C_t$ defining the maximum contrast value of ||t−M|| and a frequency band, having the value of 1 in the case that M=T. $M_c$ is the ratio of the size of ||T−M|| to that of CT, and used as a reference value for determining generation of masking and contrast masking. W is a factor determining masking difference between frequency bands when masking is generated, that is, a factor defining the inclination of a masking optic characteristic curve, which ranges from 0 (no masking) to a maximum value to which the Weber rule is applicable.

Third, in determining a quantization matrix, the visual characteristic that the human eye cannot perceive a quantization error $e_{uv}$ of a restored image, defined as the following equation, a quantization matrix QM is defined, using a just noticeable difference (JND) of the following equation (4):

$$D'_{uv} = \text{Round}(D_{uv}/QM_{uv} = 0.49999)$$

$$e_{uv} = D_{uv} - D'_{uv} \times QM_{uv} \qquad (3)$$

$$JND_{uv} = e_{uv}/CM_{uv} \qquad (4)$$

In the case that JND is 1 or below in equations (3) and (4), which is an objective reference value in which the human eye cannot perceive a quantization error in a restored image, a quantization matrix satisfying a maximum quantization error is determined as follows:

$$\text{Max}\ [e_{uv}] = QM_{uv}/2$$

$$QM_{uv} \leq 2CM_{uv} \qquad (5)$$

The macroblock classifier 21 classifies a macroblock as one of sixteen macroblock classes m, based on optic characteristics of a video signal of the macroblock. Here, the macroblock class m is classified according to chrominance and luminance signal characteristics. Macroblocks are classified into sixteen classes by combining the two classification results. Such chrominance and luminance signal characteristic classifications will be described in detail.

First, the chrominance signal characteristic classification is described.

Since a color coordinate system used for MPEG is not a uniform color space and thus a boundary between the color of a point and its adjacent color is nonlinear, a quantization interval determined by a conventional brightness component Y and activity should be involved in color consideration, to reduce a color difference between an original image and a restored image. Therefore, conventional YCbCr coordinates are transformed into a uniform color space CIE Lxaxb or CIE Lxuxvx, a color difference between the original image and the compressed/restored image is obtained, and then the quantization interval is obtained. Thus, visual characteristics are further reflected. However, it is impossible to real-time transform YCbCr into CIE Lxaxbx during MPEG coding in terms of complexity, and much time is consumed for color difference calculation.

Therefore, in the present invention, sensitivities to colors are listed in a look-up table (LUT), using color difference equations taking into account human visual perception characteristics. Meanwhile, signals Y, Cb, and Cr of the YCbCr coordinate system are divided into 8×8×8 sections (each of Y, Cb and Cr each are divided), maximum color differences along 6 directions of −Y, +Y, −Cb, +Cb, −Cr, and +Cr are calculated with the center of each section as a base, and then the distances to the maximum color differences toward Y, Cb, and Cr are stored in the LUT. Hence, the size of the LUT is 512 bytes, which is calculated in advance by experiment and thus can be real-time processed. Since sensitivities to colors can be known from the obtained LUT, visual characteristics of a color signal of a macroblock can be classified as follows:

$$\text{Color Class} = f[m\ \text{in}\ (C_{means})], \quad \text{for}\ sblk = 1, 2, 3, 4 \qquad (6)$$

-continued
$$C_{mean} = \frac{1}{64} \sum_{x=1}^{8} \sum_{y=1}^{8} (LUT(P_{x,y}))$$

where LUT(Px, y) is a color difference value stored in the LUT, and the Color Class is the result of color signal classification of a macroblock.

Then, the luminance signal characteristic classification is described.

To fully reflect human visual perception characteristics, the present invention uses a texture masking measure, that is, a combination of spatial frequency calculation and the Weber rule is used. The Weber rule indicates that the ratio of luminance of a signal unnoticed to the human eye to the luminance of an ambient signal is constant, and given by $$\frac{L}{\Delta L} = k\ (\text{constant}) \qquad (7)$$

When the luminance of the ambient signal is L in equation (7), a perceivable luminance of a signal is ΔL or above, and the human eye cannot notice the signal below ΔL.

In the texture masking measure used in the present invention, the spatial frequency of a macroblock is calculated as follows, using a threshold value derived from the Weber rule.

$$\text{texture masking} = H_n + V_n \qquad (8)$$

$$H_n = \sum_{y=1}^{16} \sum_{x=1}^{16} (|P_{x,y} - P_{x-1,y}|)th),$$

$$V_n = \sum_{y=1}^{16} \sum_{x=1}^{16} (|P_{x,y} - P_{x-1,y}|)th)$$

$$th = f\left(\sum_{y=1}^{16} P_{x,y}\right)$$

That is, if the luminance difference of luminance signals between adjacent pixels is larger than a threshold value, the human eye cannot notice a variation in luminance of a luminance signal. Thus, the luminance variation is reflected in calculating a spatial frequency. If the luminance difference between adjacent pixels is smaller than the threshold value, the variation is not reflected in calculation of the spatial frequency.

Accordingly, in the case that there are four chrominance signal characteristic classification results and four luminance signal characteristic classification results, there are sixteen macroblock classes in total, and one of sixteen macroblock classes is selected according to each classification result.

The reference quantization interval storage 22 stores a reference quantization interval Qr suited for the optic characteristic of each macroblock class. The reference quantization interval has a different value according to a macroblock class and a macroblock processing method of a frame. For example, if there are sixteen macroblock classes and three macroblock processing methods of I, B, and P frames as in MPEG, 40 (=16×3) reference quantization intervals should be determined.

Prior to the description of the block classifier 23, it is necessary to adjust the quantization interval considering a given transmission speed, since the reference quantization interval reflects only visual characteristics of a video signal.

For this purpose, the number of bits generated when quantizing the video signal at the reference quantization interval should be predicted. Therefore, the block classifier 23 is used to predict the number of bits generated during the quantization of the video signal of a block at the reference quantization interval. Generally, the number of generated bits can be roughly estimated from quantization intervals, the distribution value of a signal within a block, and relations with the bit number. However, an accurate estimation is impossible due to non-linearity and irregularities. Therefore, the number of generated bits is accurately estimated by dividing the distribution value of a block into sixteen sections and calculating the quantization interval and the number of bits of each section. Here, to divide the distribution value of the block into sixteen sections, a threshold value of the distribution value of each section is needed. This threshold value is obtained by experiment, in advance. The block classifier 23 compares the distribution value of each block and the threshold value, and selects one of the block classes.

The bit table storage 24 stores a bit table in which the relationship between a reference quantization interval and the number of bits for each section of a block class is obtained in an experiment and listed. Here, if there are sixteen macroblock classes (m=0~15) and sixteen block classes (b =0~15), and three frames of I, B, and P, the size of the bit table is 16×16×3 words, and, there are 256 block classes in total. The histogram calculator 25 calculates an accumulated generation frequency in a block frame for each case, that is, a histogram. Here, if the calculated histogram is defined as H[m][b], H[1][2] indicates how many blocks of m=1 and b=2 are generated in a frame. The histogram of a currently processed frame is completely calculated after the input of the current frame to the image encoder. Thus, the histogram result of the current frame is used for encoding the next frame.

The frame bit generation predictor 26 predicts the total number of bits generated in a frame when every macroblock in the frame is quantized by a reference quantization interval suited for the classification result of each macroblock. Here, the number of frame bits generated is calculated from a bit table (hereinafter, referred to as B[m][b]) and a histogram. If a predicted value of generated frame bits is Fe, Fe can be given as $$Fe = \sum_{m=-}^{15} \sum_{n=0}^{15} [B[m][b] \times H[m][b]] \quad (9)$$

The reference quantization interval adjuster 27 adjusts the reference quantization interval Qr as shown in FIG. 2, considering an error between a frame target bit number Ft compatible with a transmission speed, and the predicted value Fe of frame bits generated. An adjusted reference quantization interval is Qr'.

$$E = Ft - Fe \quad (10)$$

$$Qr'[m] = Qr[m] - \frac{E \times W_I[m] \times 31}{S}, \text{ if } E < 0$$

$$Qr'[m] = Qr[m] - \frac{E \times W_D[m] \times 31}{S}, \text{ if } E \geq 0$$

where Qr[m] indicates a reference quantization interval for a macroblock class m, S is the size of the buffer 14 of FIG. 1, and $W_I$ and $W_D$ are weights of m.

The target bit allocator 28 allocates block target bits for a 256 block classification, considering an error between Ft and Fe, and a bit table. Such block target bits are values reflecting human visual perception characteristics, distribution of a video signal in a frame, and a transmission speed. Here, if a target bit number to be allocated to macroblock class m and block class b is Bt[m][b], $$Bt[m][b] = B[m][b]\left(\frac{Ft}{Fe}\right) \quad (11)$$

On the other hand, when the target bit number of a jth block in an ith macroblock is Bt(i, j), the macroblock class is m, and the block class is b, $$Bt(i,j) = Bt[m][b] \quad (12)$$

where a target macroblock bit of the ith macroblock can be expressed as the sum of the target bits of blocks in the macroblock.

$$MBt(i) = \sum_{j=1}^{N} Bt(i, j), N; \text{sum of blocks in macroblock} \quad (13)$$

The bit rate controller 29 calculates requirements for the buffer 14 of FIG. 1 from the number of bits generated during encoding up to the previous macroblock, and calculates a final quantization interval by using the buffer requirement and the reference quantization interval Qr. Assuming that the final quantization interval of the nth macroblock in a frame is $Q_f(n)$ and the buffer requirement after coding the (n−1)th macroblock is B(n−1), the final quantization interval is given by $$B(n-1) = \sum_{i=1}^{n-1} [B_R(i) - MBt(i)] \quad (14)$$

$$Q_j = Qr' + \frac{K[B_I + B(n-1)]}{S}$$

where $B_R$ (i) is the number of bits resulting from encoding the ith macroblock, $B_I$ is a buffer requirement before current frame processing, S is the size of the buffer 14 of FIG. 1, and K is a constant.

As described above, the quantization interval determining method and circuit of the present invention classifies a video signal based on human visual perception characteristics, determines a reference quantization interval suited for each class, adaptively allocates a target bit, considering distribution of the video signal, to determine a quantization interval compatible with a given transmission speed, simultaneously with the reference quantization interval determination, and then determines a final quantization interval. Therefore, when encoding a video signal by using a quantization interval obtained in the above manner, the compression rate of a video signal and the quality of a restored image can be increased.

What is claimed is:

1. A quantization interval determining method for determining a quantization interval of an encoded video signal to be transmitted over a transmission medium, comprising the steps of:

(a) classifying a video signal on the basis of a predetermined perception characteristics into one of a plurality of classes;

(b) determining a reference quantization interval based upon each class classified in said step (a);

(c) predicting the number of bits generated when every macroblock in a frame of said video signal is quantized at said reference quantization level;

(d) adjusting said reference quantization interval by comparing said predicted number of bits generated with a target bit number for a given transmission speed;

(e) adaptively allocating a target number of bits for each said macroblock, taking into consideration distribution of said video signal over said macroblock to determine a quantization interval suitable for a given transmission speed; and (f) determining a final quantization interval from said adjusted reference quantization interval, a buffer requirement, and said target number of bits.

2. A quantization interval determining circuit comprising:

a quantizer matrix calculating portion for obtaining a quantization matrix to vary a quantization interval by a predetermined perception characteristics in 8×8 discrete cosine transform (DCT) blocks, according to the position of a DCT coefficient;

a classifying portion for classifying a macroblock according to the a predetermined perception characteristic of a video signal in said macroblock;

a reference quantization interval storing portion for storing a reference quantization interval suitable for the class of each macroblock classified in said macroblock classifying portion;

a block classifying portion for classifying a block by a distribution value of a video signal in said block;

a bit table storing portion for storing the number of bits generated when blocks of each block class classified in said block classifying portion are quantized by different quantization intervals;

a histogram calculating portion for calculating the frequency of blocks generated in a frame, for every combination of macroblock classes classified in said macroblock classifying portion and block classes classified in said block classifying portion;

a frame bit generation predicting portion for predicting the number of frame bits generated by using a histogram calculated in said histogram calculating portion, when every macroblock in a frame is quantized at said reference quantization interval;

a reference quantization interval adjusting portion for adjusting a reference quantization interval stored in said reference quantization interval storing portion by using the number of frame bits predicted in said frame bit generation predicting portion;

a target bit allocating portion for allocating a target bit number, considering an error between a frame target bit compatible with a transmission speed and said predicted number of frame bits generated, for every combination of said macroblock classes and said block classes; and a bit rate controlling portion for determining a final quantization interval from said adjusted reference quantization interval and a buffer requirement calculated from the number of bits generated by encoding up to a previous macroblock.

* * * * *